(12) United States Patent
Yim

(10) Patent No.: US 6,192,124 B1
(45) Date of Patent: Feb. 20, 2001

(54) METHOD FOR ACCESSING A COUNTRY CODE OR AN AREA CODE STORED IN A TELEPHONE TO DIAL A TELEPHONE NUMBER

(75) Inventor: Do-Hyon Yim, Seoul (KR)

(73) Assignee: Samsung Electronics Co., Ltd. (KR)

( * ) Notice: Under 35 U.S.C. 154(b), the term of this patent shall be extended for 0 days.

(21) Appl. No.: 08/991,348

(22) Filed: Dec. 16, 1997

(30) Foreign Application Priority Data

Dec. 16, 1996 (KR) .................................................. 96-66357

(51) Int. Cl.[7] ..................................................... H04M 1/27
(52) U.S. Cl. ........................... 379/356; 379/354; 455/564
(58) Field of Search .................................... 379/352, 356, 379/355, 357, 216, 207, 265; 455/564

(56) References Cited

U.S. PATENT DOCUMENTS 5,157,719 * 10/1992 Waldman ............................. 379/356
5,455,858 * 10/1995 Lin ....................................... 379/355
5,459,774 * 10/1995 Breeden ............................... 379/354
5,475,743 * 12/1995 Nixon et al. ......................... 379/113

* cited by examiner

Primary Examiner—Wing F. Chan
(74) Attorney, Agent, or Firm—Dilworth & Barrese, LLP

(57) ABSTRACT

A method for dialing a country code and area code of a telephone number in a telephone having a memory for storing country codes, area codes and various indication data, a key input part having a common number selecting key and a selection key for the various indication data, and a display, the method comprising the steps of: displaying first indication data on the display when data of the common number selecting key is input through the key input part while the telephone is in a hook-on state; and finding a desired country code or area code by using the selection key and the indication data, and displaying the desired country code or the desired area code on the display. Once the desired country code or area code is found, the user may then enter a telephone number and the telephone call will be made using the desired country code or area code together with the telephone number entered by the user.

13 Claims, 4 Drawing Sheets

21

| | | | JAPAN(1): 81 |
|---|---|---|---|
| INTERNAT-IONAL(1) | 001(1) | ASIA(1) | CHINA(2): 86 |
| | | | ⋮ |
| | 002(2) | EUROPE (2) | ENGLAND(1): 44 |
| | | | FRANCE(2): 33 |
| | | | ⋮ |
| | ⋮ | | |
| DOMESTIC (2) | CITY(1) | | SEOUL(1): 02 |
| | | | PUSAN(2): 051 |
| | | | ⋮ |
| | PROVINCE (2) | | SUWON(1): 0331 |
| | | | GOYANG(2): 0344 |
| | | | ⋮ |

FIG. 2

METHOD FOR ACCESSING A COUNTRY CODE OR AN AREA CODE STORED IN A TELEPHONE TO DIAL A TELEPHONE NUMBER

BACKGROUND OF THE INVENTION

1. Field of the Invention

The present invention relates to a method for dialing a telephone number and, in particular, to a method for dialing an international or long-distance telephone number by first accessing a desired country code or area code, which is stored in a memory of the telephone, and then dialing the telephone number using the country code or area code which was retrieved from the memory.

2. Description of the Related Art

In general, a telephone number consists of an international telephone identification code, a country code, an area code and a subscriber's number. For example, 001 and 002 are the international telephone identification codes for Korea. Furthermore, the country code for Korea is 82, and the country code for Japan is 81. Next, the area code for Seoul, Korea is 01, and the area code for Soonchun, Korea is 0661.

There are various methods which may be utilized for dialing telephone numbers in conventional telephones. For example, a user may off-hook a telephone, (i.e., take a handset from the receiver or press a specific function key to put the telephone in its dialing mode to obtain a dial tone) and then directly dial a desired telephone number by pressing the corresponding numeric keys on the telephone. Additionally, the user may dial a telephone number by pressing a redialing key, which operates a redialing function, to automatically redial a previously dialed telephone number which is stored in the telephone. Another method for dialing a telephone number involves the use of short keys (i.e, speed dial function), whereby a user first inputs a frequently used telephone number by pressing the appropriate numeric keys and then stores such telephone number by pressing a particular short key. The user may then subsequently dial a stored telephone number by pressing the corresponding short key.

These methods are very useful when the telephone number is either a local telephone number (i.e., a telephone number that is included in the user's area code), a telephone number which can be dialed by pressing the corresponding short key (i.e., performing a speed dial function), or a telephone number that is stored in the redialing key. Conventional telephones, however, do not store country codes and area codes. Consequently, when a user wants to make either a long-distance call (i.e., a telephone number that is not included in the user's area code) or an international call, the user must know the area code or country code, as well as subscriber's number. Otherwise, the user must obtain the desired area code or country code from a telephone directory or computer program, which is an extremely burdensome task. Moreover, with the development of mobile communications and the resulting wide use of cellular phones, such burden is increased since country code and area code information is not readily available to a user when, for example, the cellular phone is being used while the user is driving his or her car.

SUMMARY OF THE INVENTION

It is an object of the present invention to provide a method for dialing a telephone number, whereby area codes and country codes are stored in a memory of a telephone, and a user can dial a long distance telephone number or an international telephone number by retrieving from memory a desired area code or country code to make the long-distance or international telephone call.

In one aspect of the present invention, a method for dialing a country code and area code of a telephone number in a telephone having a memory for storing country codes, area codes and various indication data, a key input part having a common number selecting key and a selection key for the various indication data, and a display, the method comprising the steps of: displaying first indication data on the display when data of the common number selecting key is input through the key input part while the telephone is in a hook-on state; and finding a desired country code or area code by using the selection key and the indication data, and displaying the desired country code or the desired area code on the display. Once the desired country code or area code is found, the user may then enter a telephone number and the telephone call will be made using the desired country code or area code together with the telephone number entered by the user.

This and other objects, features and advantages of the present invention will become apparent from the following detailed description of illustrative embodiments, which is to be read in connection with the accompanying drawings.

BRIEF DESCRIPTION OF THE DRAWINGS

FIG. 2 shows a memory mapping for storing country codes and area codes according to the present invention.

DETAILED DESCRIPTION OF A PREFERRED EMBODIMENT

A preferred embodiment of the present invention is described in detail with reference to the accompanying Figures. In the following description, however, details will not be provided for functions and constructions which are either known and obvious to one of ordinary skill in the art or which are unnecessary to understand, and would merely obscure, the subject matter of the present invention.

Figure 1:
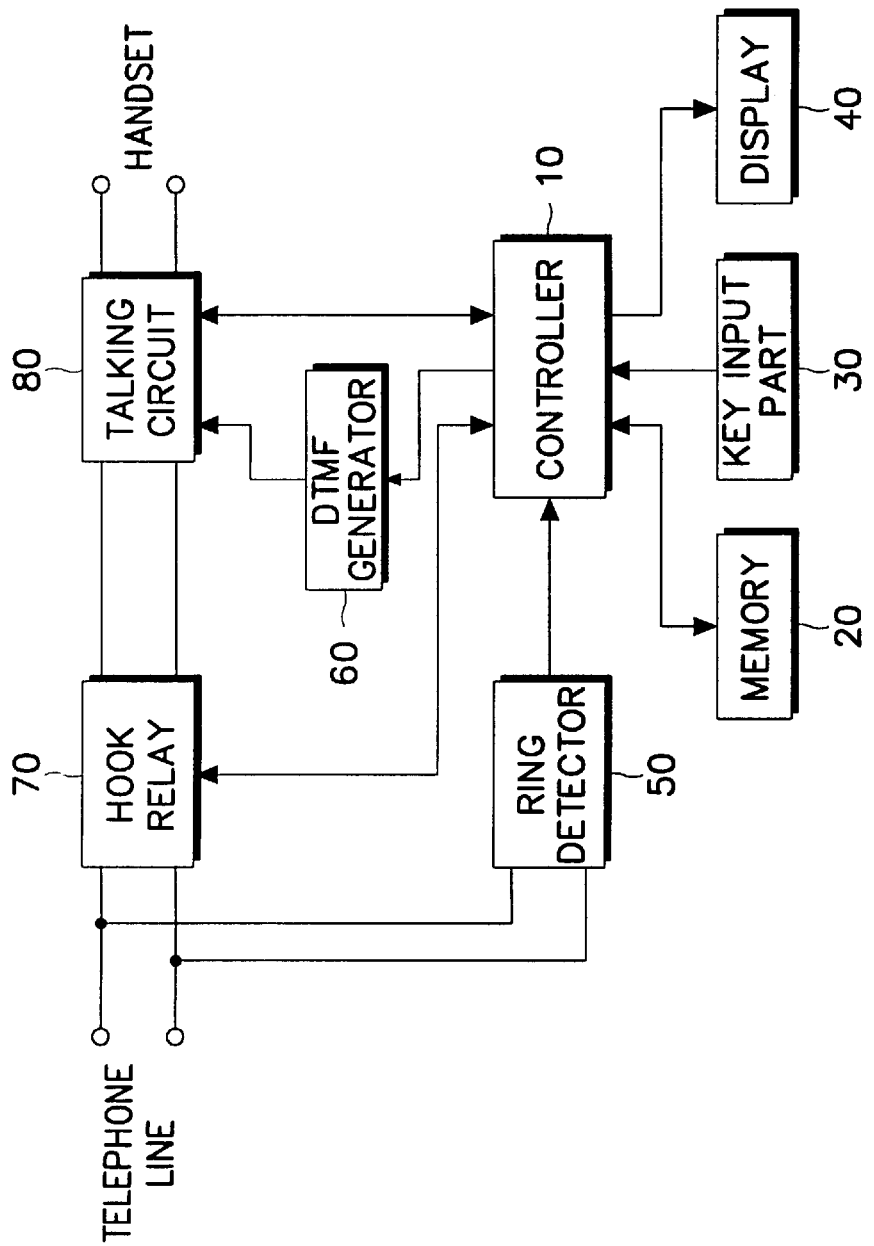
FIG. 1 is a block diagram showing components of a telephone which may be utilized in performing the method associated with the present invention.

Referring to FIG. 1, a block diagram of components of a telephone which may be utilized for performing the method associated with the present invention is shown. A controller 10 controls the general operations of the telephone. A memory 20, operatively connected to the controller 10, includes a ROM (not shown), for storing an execution program according to the present invention, and a RAM, for temporarily storing data generated during the execution of such program. The memory 20 is also used for storing various indication data (to be explained below), international telephone identification codes, country codes and area codes. The memory 20 further includes a buffer (not shown) for temporarily storing a telephone number which is selected by a user.

A key input part 30, operatively connected to the controller 10, includes a plurality of function keys (not shown), for setting various functions and modes of the telephone, as well as numeric keys (not shown), for performing dialing operations. The key input part 30 sends key data (which specifically corresponds to the key pressed by the user) to the controller 10. In particular, the key input part 30 includes a common number selecting key (not shown), and a selection key (not shown) for selecting certain information in accordance with the indication data. As demonstrated below, the common number selecting key is the key which is pressed to initiate the dialing method according to the present invention. A common number in the common number selecting key corresponds to numbers such as an international telephone identification codes, country codes or area codes, which are commonly used by the user.

A display 40 (e.g, a liquid crystal display), operatively connected to the controller 10, displays the indication data under the control of the controller 10. A ring detector 50, operatively connected between a telephone line and the controller 10, detects a ring signal transmitted through the telephone line while the telephone is in an on-hook state (i.e., a receiving state in which the telephone can receive an incoming call). The ring detector 50 sends the detected ring signal to the controller 10 to inform the controller 10 that the telephone is receiving an incoming call. A hook relay 70, operatively connected between the telephone line and the controller 10, includes a hook switch (not shown) for connecting or blocking the signal path between the telephone line and telephone under the control of the controller 10. The hook relay 70 may be turned on or off by either a transmitting/receiving portion of a cordless telephone or the hook switch of a conventional telephone.

A talking circuit 80 (i.e., a speech integrated circuit (IC)), operatively connected between the hook relay 70 and transmitting/receiving portion (not shown), is provided for processing various tone signals and voice signals which are transmitted and received on the telephone line. In the telephone described herein, the transmitting/receiving portion may be a microphone and speaker. In a cordless answering telephone, the transmitting/receiving portion is connected in parallel to an RF signal processor. A dual tone multi-frequency (DTMF) generator 60, operatively connected between the controller 10 and the talking circuit 80, generates DTMF signals and sends such signals to the talking circuit 80 under the control of the controller 10.

Referring now to FIG. 2, a memory mapping for storing country codes and area codes according to the present invention is shown. Reference numeral 21 of FIG. 2 denotes a region in memory 20 where the international telephone identification codes are stored. The numbers in the parentheses are used to denote the corresponding numeric key of the telephone which must be pressed to select the corresponding region when the phone is not equipped with a transfer selecting key. The memory mapping of FIG. 2 is preferably designed to give priority to those numbers that are widely used so that the user can easily find a desired area code or country code from a large amount of area codes and country codes.

Figure 3A:
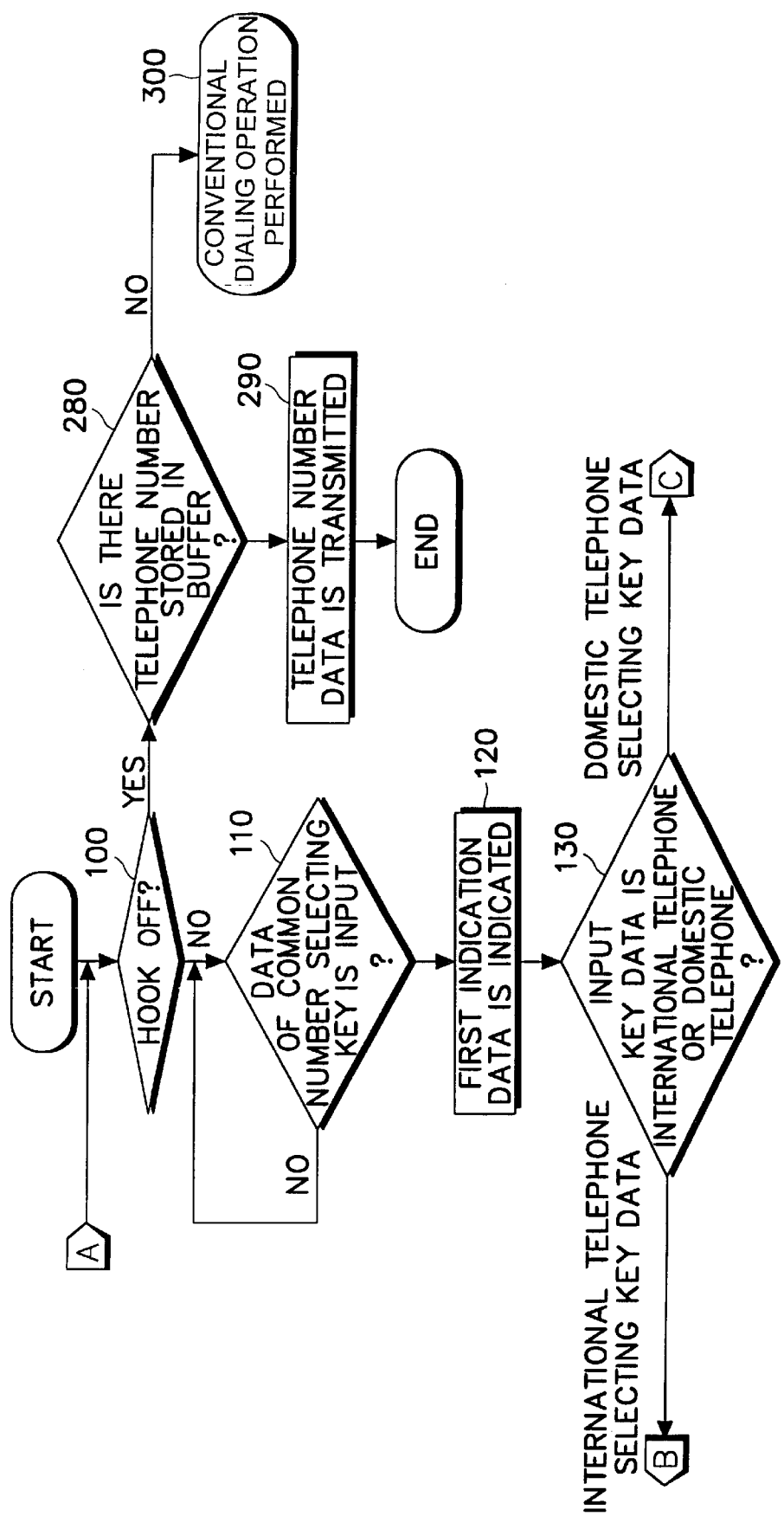
FIGS. 3a and 3b are flow diagrams showing the method for dialing a telephone number with a country code or an area code according to the present invention.
Figure 3B:
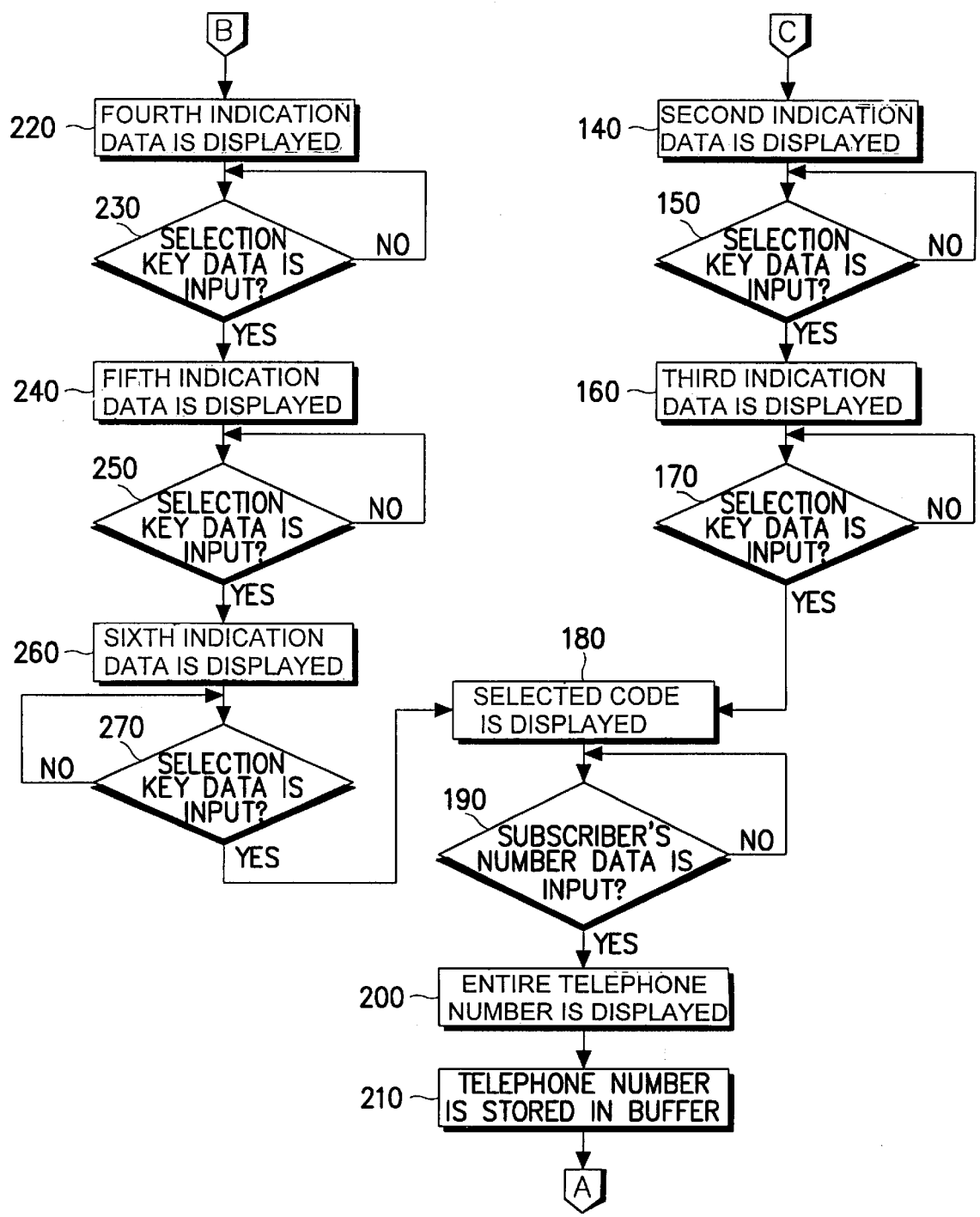

Referring now to FIGS. 3a and 3b, a flow diagram illustrating a method for dialing an international telephone number, a long-distance telephone number or a local number according to the present invention is shown. The dialing method of the present invention is also described with reference to FIGS. 1 and 2.

Initially, in order to retrieve a country code or an area code from the memory 20 to make either an international call or a long-distance call, the telephone must be in its on-hook state (i.e., its receiving state for receiving an incoming telephone call) (step 100). While the telephone is in the receiving state, the user presses the common number selecting key of the key input part 30. The controller 10 then receives the key data which is generated by pressing the common number selecting key of the key input part 30 and processes such key data (step 110). Next, the controller 10 reads first indication data from the memory 20, and then displays such data on the display 40 (step 120). Preferably, the first indication data is character indication data in the form of an inquiry to the user as to whether an international or long-distance call will be made.

Next, the user presses the appropriate key on the key input part 30 to make a selection from the first indication data. The controller 10 then receives the corresponding key data from the key input part 30 and processes such key data to determine whether the user desires to make an international call or a long-distance call (i.e., a domestic call which is outside the user's area code) (step 130).

In the situation where the controller 10 determines (in step 130) that the user wants to make a long-distance call (i.e., a domestic call in FIG. 2), the controller 10 will read second indication data from the memory 20 and then display such data on the display 40 (step 140). The second indication data provides guidance to the user to quickly find the desired city or province wherein the user will make the domestic call. Once the desired area (i.e., city or province) is found on the display 40, the user selects such area by pressing the appropriate key on the key input part 30 in accordance with the second indication data. The controller 10 then receives and processes the key data generated by the user's selection from the key input part 30 (step 150).

Next, the controller 10 reads third indication data from the memory 20 and displays such data on the display 40 (step 160). The third indication data provides guidance to the user for selecting an area code which corresponds to the selected area. Once the desired area code is found on the display 40, the user selects such area code by pressing the appropriate key on the key input part 30 in accordance with the third indication data. The controller 10 then receives and processes the key data generated by the user's selection from the key input part 30 (step 170), and then displays the selected area code of the selected area on the display 40 (step 180).

Next, the user will input a desired telephone number by pressing the appropriate numeral keys on the key input part 30 (step 190). The controller 10 then receives and processes the key data from key input part 30 corresponding to the telephone number entered in step 190, and then displays the entire telephone number consisting of the selected area code and the subscriber's number on the display 40 (step 200). The controller 10 then stores the entire telephone number in the buffer of the memory 20 (step 210).

Next, referring back to step 100 in FIG. 3a, in order to make the domestic call, the telephone must be in its off-hook state (i.e., its dialing mode such as where, e.g., the handset of a conventional telephone is removed from the telephone receiver or, in a cordless telephone, when the user presses the "on" key on the telephone). The controller 10 signals the hook relay 70 to determine if the telephone is in the off-hook state (i.e., dialing mode) (step 100). If the telephone is in the off-hook state, the controller 10 then determines if telephone number data is stored in the buffer of the memory 20 (step 280). If telephone number data is stored in the buffer of the memory 20, the controller 10 sends such data to the DTMF generator 60. The DTMF generator 60 then converts the telephone number data into a DTMF signal, and transmits it to the telephone line through the talking circuit 80 (step 290) to commence the call.

If, on the other hand, the controller 10 determines that no telephone number data in stored in the buffer of the memory 20 (e.g., where the user is making a local call and did not need to access an international code or an area code according to the present invention), the controller 10 performs a conventional dialing operation to make a local call (step 300).

Referring back to step 130 in FIG. 3a, in the situation where the controller 10 determines that the user wants to make an international call (i.e., the received key data is international telephone selecting key data), the controller 10 will read fourth indication data from the memory 20 and then displays such data on the display 40 (step 220). The fourth indication data provides guidance to the user for selecting a desired international telephone identification code. Once the desired international code is found on the display 40, the user selects such code by pressing the appropriate key on the key input part 30 in accordance with the fourth indication data. The controller 10 then receives and processes the key data generated by the user's selection from the key input part 30 (step 230).

Next, the controller reads fifth indication data from the memory 20 and displays such data on the display 40 (step 240). The fifth indication data provides guidance to the user to quickly find the continent of the desired country wherein the user wants to make the international call. Once the continent to which a desired country is found on the display 40, the user selects such continent by pressing the appropriate key on the key input part 30 in accordance with the fifth indication data. The controller 10 then receives and processes the key data generated by the user's selection from the key input part 30 (step 250).

Next, the controller 10 reads sixth indication data from the memory 20 and displays such data on the display 40 (step 260). The sixth indication data provides guidance to the user for selecting a country code which corresponds to the selected continent. Once the desired country is found on the display 40, the user selects such country by pressing the appropriate keys on the key input part 30 in accordance with the sixth indication data (step 270). The controller 10 then displays the selected country code on the display 40 (step 180). It is to be understood that the remaining steps for effecting the international call are similar to the above-described steps (commencing with step 190) for a long-distance call and, consequently, will not be repeated.

As demonstrated above, according to the present invention, the country codes and area codes are stored in the telephone, and the user may obtain a desired country code or area code when making and international call or long-distance call, respectively, by retrieving such codes from the memory of the telephone. As a result, the user has no need to access a separate reference wherein the country codes and area codes are recorded. Furthermore, in addition to accessing the various country codes or area codes, the present invention allows a user to make a local call by simply dialling a desired telephone number of a subscriber. The present invention is particularly beneficial when using a pay phone or cellular phone since reference materials for finding the country codes or area codes are generally not readily available in such situations.

Although an illustrative embodiment of the present invention has been described herein with reference to the accompanying drawings, it is to be understood that the present invention is not limited to that precise embodiment, and that various other changes and modifications may be affected therein by one skilled in the art without departing from the scope or spirit of the invention. All such changes and modifications are intended to be included within the scope of the present invention as defined by the appended claims.

What is claimed is:

1. A method for dialing a country code, an area code, or both of a telephone number in a telephone having a memory for storing country codes, area codes and various indication data, a key input part having a common number selecting key and a selection key for the various indication data, and a display, the method comprising the steps of:

displaying first indication data on said display when said common number selecting key is pressed by a user while said telephone is in an on-hook state;

selecting, by the user, a desired country code or area code using said selection key to select from items displayed in said first indication data; and displaying a selected desired country code or a selected desired area code on said display.

2. The method of claim 1, the selecting step comprising the substeps of:

a first step of receiving data input by said selection key operated in accordance with the guidance of said first indication data, and finding said desired country code using said indication data and said selection key when the data of said selection key is international telephone selecting key data; and a second step of finding said desired area code using said indication data and said selection key when the data of said selection key is domestic telephone selecting key data.

3. The method of claim 2, said first step comprising the substeps of:

displaying fourth indication data for selecting an international telephone identification code when said international telephone selecting key data is input;

displaying fifth indication data for selecting a continent to which a desired country belongs when the data of said selection key which selects said international telephone identification code is input; and displaying sixth indication data for selecting said desired country code corresponding to said continent when the data of said selection key which selects said continent is input.

4. The method of claim 2, said second step comprising the substeps of:

displaying second indication data for selecting a city or a province corresponding to said desired area code when said domestic telephone selecting key data is input; and displaying third indication data for selecting said desired area code corresponding to said selected city or province when the data of said selection key which selects said city or province is input.

5. The method of claim 1, further comprising the steps of:

receiving a number of a party to be called;

storing an entire telephone number in a buffer of said memory after said selecting step, said entire telephone number comprising said number of the party to be called and one of said selected country code or selected area code;

determining if said entire telephone number is stored in said buffer when the telephone is in a off-hook state; and transmitting said entire telephone number stored in said buffer if said entire telephone number is stored in said buffer.

6. The method of claim 5, further comprising the step of performing a conventional dialing mode when no telephone number is stored in said buffer.

7. A method for accessing a desired country code or an area code in a memory of a telephone, said telephone having a telephone number selecting key and a display, the method comprising the steps of:

pressing, by a user, said telephone number selecting key while said telephone is in a state capable of receiving incoming calls;

displaying first indication data on said display in response to said pressing of said telephone number selecting key;

selecting, by the user, one of said desired country code or area code by using said telephone number selecting key to select from said first indication data and additional indication data, and displaying the selected one of said desired country code or area code on said display of said telephone.

8. The method of claim 7, the step of selecting one of said desired country code or area code further comprising the steps of:

processing data generated by pressing said telephone number selecting key in accordance with guidance from said first indication data; and finding said desired country code using said additional indication data and said telephone number selecting key when said processed data corresponds to international telephone key data.

9. The method of claim 7, the step of selecting one of said desired country code or area code further comprising the steps of:

processing data generated by pressing said telephone number selecting key in accordance with guidance from said first indication data; and finding said desired area code using said additional indication data and said telephone number selecting key when said processed data corresponds to domestic telephone key data.

10. The method of claim 8, wherein said additional indication data includes fourth indication data, fifth indication data and sixth indication data, and the step of selecting said desired country code further comprises the steps of:

displaying said fourth indication data on said display;

selecting a desired international telephone identification code in accordance with said displayed fourth indication data;

displaying said fifth indication data on said display after said selection of said international telephone identification code is performed;

selecting a continent to which a desired country code belongs in accordance with said displayed fifth indication data;

displaying said sixth indication data on said display after said selection of said continent is performed; and selecting said desired country code which corresponds to said selected continent in accordance with said sixth indication data.

11. The method of claim 9, wherein said additional indication data includes second indication data and third indication data, and the step of selecting said desired area code further comprises the steps of:

displaying said second indication on said display;

selecting a city or province corresponding to said desired area code in accordance with said second indication data;

displaying said third indication data on said display after said selection of said city or province is performed; and selecting said desired area code in accordance with said third indication data.

12. The method of claim 7, further comprising the steps of:

entering a telephone number into said telephone when said telephone is in a state in which a telephone number may be dialed;

storing a complete telephone number in a buffer of said memory, said complete telephone number comprising one of said selected country code or selected area code together with said entered telephone number;

determining if said complete telephone number is stored in said buffer when said telephone is in said state in which a telephone number may be dialed; and transmitting said complete telephone number to make call if it is determined that said complete telephone number is stored in said buffer.

13. The method of claim 12, further comprising the step of performing a conventional dialing operation when it is determined that said buffer does not contain a telephone number.

* * * * *